(12) United States Patent
Knittel

(10) Patent No.: US 8,693,302 B2
(45) Date of Patent: Apr. 8, 2014

(54) COMPATIBLE OPTICAL RECORDING MEDIUM

(75) Inventor: Joachim Knittel, Tuttlingen (DE)

(73) Assignee: Thomson Licensing, Boulogne-Billancourt (FR)

( * ) Notice: Subject to any disclaimer, the term of this patent is extended or adjusted under 35 U.S.C. 154(b) by 851 days.

(21) Appl. No.: 12/449,906

(22) PCT Filed: Feb. 18, 2008

(86) PCT No.: PCT/EP2008/051927
§ 371 (c)(1),
(2), (4) Date: Sep. 1, 2009

(87) PCT Pub. No.: WO2008/107298
PCT Pub. Date: Sep. 12, 2008

(65) Prior Publication Data
US 2010/0002567 A1    Jan. 7, 2010

(30) Foreign Application Priority Data

Mar. 2, 2007   (EP) .................................... 07103425

(51) Int. Cl.
*G11B 7/00* (2006.01)
*G11B 7/24* (2013.01)

(52) U.S. Cl.
USPC ............... 369/275.1; 369/275.4; 369/275.3; 369/276; 369/277

(58) Field of Classification Search
None
See application file for complete search history.

(56) References Cited

U.S. PATENT DOCUMENTS

| 6,004,646 | A | 12/1999 | Ohno et al. | |
| 6,018,510 | A | 1/2000 | Abe et al. | |
| 7,778,145 | B2 * | 8/2010 | Horie et al. | 369/275.4 |
| 2002/0006106 | A1 * | 1/2002 | Nakajima | 369/275.4 |
| 2005/0237910 | A1 * | 10/2005 | Martens | 369/275.4 |
| 2009/0022931 | A1 * | 1/2009 | Morita et al. | 428/64.4 |
| 2009/0059778 | A1 * | 3/2009 | Shimizu et al. | 369/275.4 |
| 2010/0027393 | A1 * | 2/2010 | Yashiro et al. | 369/53.2 |

FOREIGN PATENT DOCUMENTS

| EP | 0971342 | 1/2000 |
| EP | 1258870 | 11/2002 |
| JP | 8083426 | 3/1996 |
| JP | 10283671 | 10/1998 |
| JP | 10326436 | 12/1998 |
| JP | 2005158257 | 6/2005 |
| JP | 2006269071 | 10/2006 |
| WO | WO 98/24089 | 6/1998 |

OTHER PUBLICATIONS

Search Report Dated Mar. 20, 2008.

* cited by examiner

*Primary Examiner* — Wayne Young
*Assistant Examiner* — Dionne Pendleton
(74) *Attorney, Agent, or Firm* — Robert D. Shedd; Vincent E. Duffy; James McKenzie

(57) ABSTRACT

The present invention relates to a format of a recordable optical recording medium, which is designed in such a way that it can be read by any standard player and recorder. The optical recording medium has a recording layer with a structure of lands and grooves, which generates a strong push-pull signal in an area of the recording layer without recorded marks and a small push-pull signal in an area of the recording layer with recorded marks.

8 Claims, 4 Drawing Sheets

Gray Level: Black: Minimum; White: Maximum

COMPATIBLE OPTICAL RECORDING MEDIUM

Figure 1:
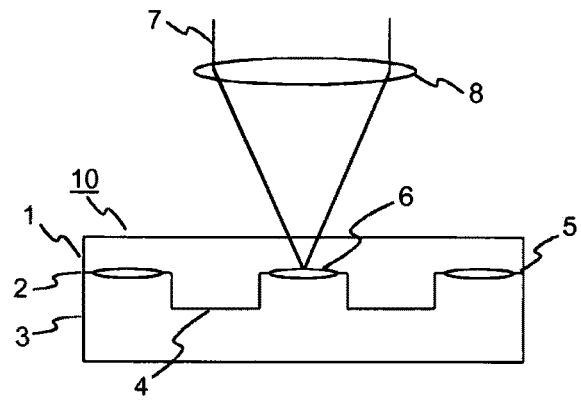

This application claims the benefit, under 35 U.S.C. §365 of International Application PCT/EP2008/051927, filed Feb. 18, 2008, which was published in accordance with PCT Article 21(2) on Sep. 12, 2008 in English and which claims the benefit of European patent application No. 07103425.0, filed Mar. 2, 2007.

The present invention relates to a format of a recordable optical recording medium, which is designed in such a way that it can be read by any standard player and recorder.

The distribution of digital data such as movies or software on optical recording media today is established as the main distribution channel. However, this means that stores need to stock a large amount of titles in order to be able to provide most requested titles immediately to their customers without having to order them.

In order to reduce this need for a large stock several solutions for a manufacturing on demand or a distribution via networks have been proposed. The optical recording medium, typically a DVD (digital versatile disk), is recorded as soon as a title is requested by a customer. Recording is done with a special recorder provided in a store, with a kiosk type recording terminal, or by a special consumer recorder connected to a network. These special recorders allow to write data to a recordable DVD in such a way that the DVD has the appearance of a CSS-encrypted DVD-Video (ROM) disk, even though it is a specially finalized recordable DVD. For recording the optical recording medium has a groove structure to guide an optical pickup unit relative to the optical recording medium.

In order to establish the above described solutions as further distribution channels, the recorded optical recording media have to be compatible with as many standard players and recorders as possible. While this is usually not a problem for players, the situation is different with recorders. As a copy protection mechanism some optical pickups used in recorders do not allow to retrieve data from an optical recording medium indicated as a read-only medium when it is in fact a recordable optical recording medium. Such incompatibilities have to be avoided.

It is an object of the invention to propose a format for a recordable optical recording medium, which has the appearance of a read-only optical recording medium for most players and recorders.

According to the invention, this object is achieved by an optical recording medium with a recording layer having a structure of lands and grooves, which generates a strong push-pull signal in an area of the recording layer without recorded marks and a small push-pull signal in an area of the recording layer with recorded marks. Advantageously, the absolute value of the strong normalized push-pull signal is larger than 0.2 and the absolute value of the small push-pull signal is lower than 0.1. The solution according to the invention has the advantage that unrecorded areas of the recording layer generate a push-pull signal sufficient for push-pull tracking. At the same time, since a push-pull signal originating from the groove structure is an indication of a recordable optical recording medium, the reduced push-pull signal of the recorded areas improves the compatibility with players and recorders. The push-pull signal generated by the recorded areas is simply too small to be detected as an indicator for a recordable optical recording medium.

Advantageously, the recorded marks generate an additional push-pull signal, which is out of phase with the push-pull signal caused by the structure of lands and grooves. The layer stack of the optical recording medium is designed in such a way that the average phase shift introduced by the written marks is similar to the phase shift introduced by the grooves. If the marks are situated in the land regions, the marks generate a diffraction grating that is shifted by halve the track pitch relative to the structure of lands and grooves. As a consequence the marks produce an additional push-pull signal, which is preferably 180±20 degrees out of phase with the push-pull signal caused by the structure of lands and grooves. This reduces the total push-pull amplitude.

In case the lands and grooves of the optical recording medium have the same width, the width of the marks advantageously is within 80% and 100% of the width of the grooves when the marks are recorded in the lands. When the marks are recorded in the grooves, the width of the marks advantageously is within 80% and 100% of the width of the lands. This has the advantage that the symmetry of the structure of lands and grooves is broken and the diffraction into higher orders increases. This lowers the diffraction into the ±1st orders, which are responsible for the push-pull signal. As a result the push-pull amplitude is reduced. When the width of the marks is 100% the width of the grooves/lands, in average no grating caused by the structure of lands and grooves remains.

In case the width of the two track types is different, i.e. grooves and lands do not have the same width, and the marks are written into the larger track type, the width of the marks is preferably within 80% and 120% of the width of the smaller track type. This has the advantage that the track pitch of the optical recording medium is reduced by a factor of two. The smaller track pitch results in a larger diffraction angle. This, in turn, means that the push-pull signal is close to zero, as the ±1st diffraction orders do no longer reach the pupil of an objective lens for collecting the light beams reflected by the optical recording medium.

Advantageously, the phase shift introduced by the marks is between 1.5 and 2 times the phase shift introduced by the grooves relative to the lands when the marks are recorded in the lands, and between 1.5 and 2 times the phase shift introduced by the lands relative to the grooves when the marks are recorded in the grooves.

On a recorded optical recording medium on average only 50% of the available space along the track is recorded, as the recorded marks alternate with spaces. To cancel the push-pull signal with a phase shifted grating, its average amplitude needs to be similar to the amplitude from the structure of lands and grooves. This is preferably achieved by increasing the diffraction amplitude of each mark by a factor of 1.5 to 2. For small values of the phase shift ($<\pi/8$) this corresponds to increasing the phase shift of the marks by a factor of 1.5 to 2. As the push-pull signal is a low frequency signal (<5 kHz) compared to the data frequency (>10 MHz), the fluctuations due to the varying mark pattern have no influence.

The push-pull signal generated by the unrecorded areas may lead to compatibility problems with some players or recorders. These are favorably overcome by a method for recording an optical recording medium according to the invention, where the optical recording medium is finalized by writing marks into the unrecorded areas of the recording layer. It is sufficient to modify the recording software to always write marks in these unrecorded areas.

Figure 2:
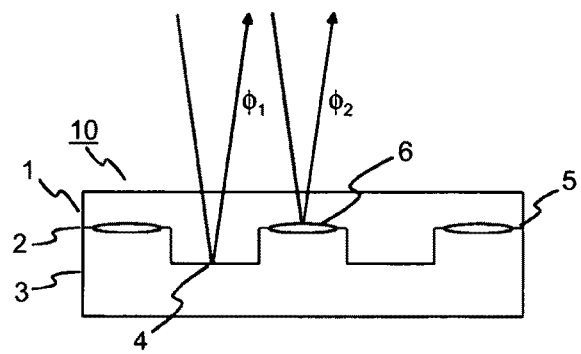
Figure 3:
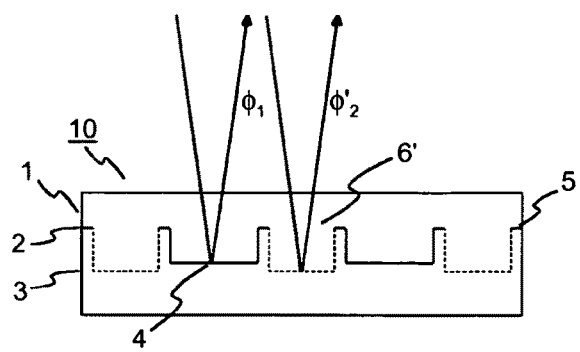
Figure 4:
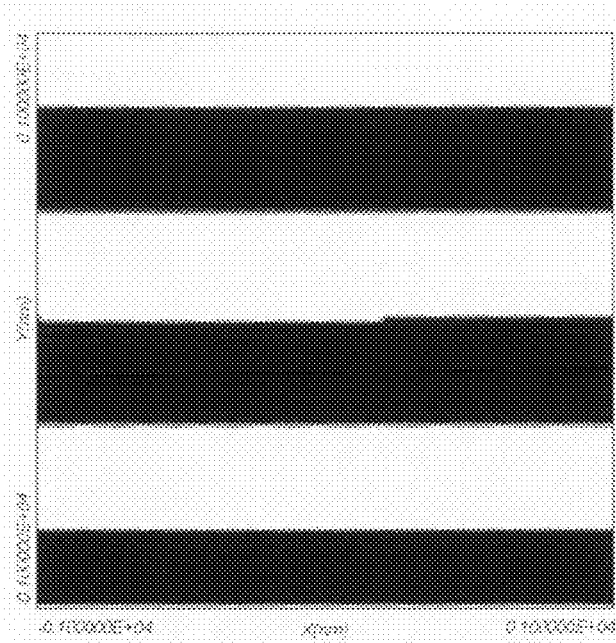
Figure 5:
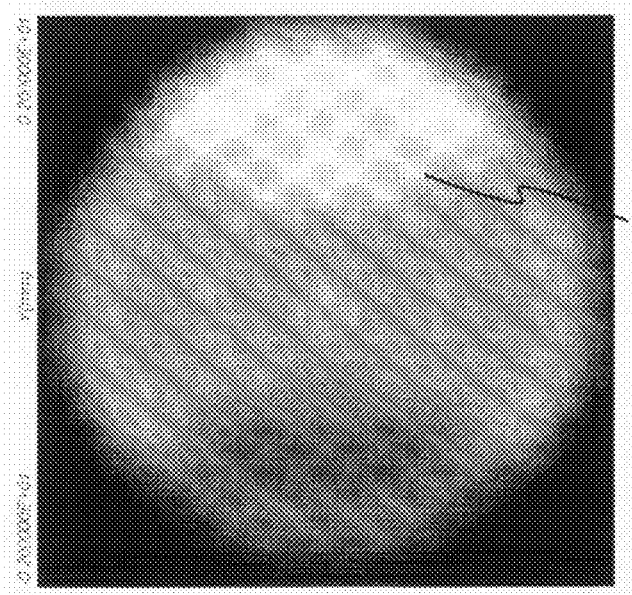
Figure 6:
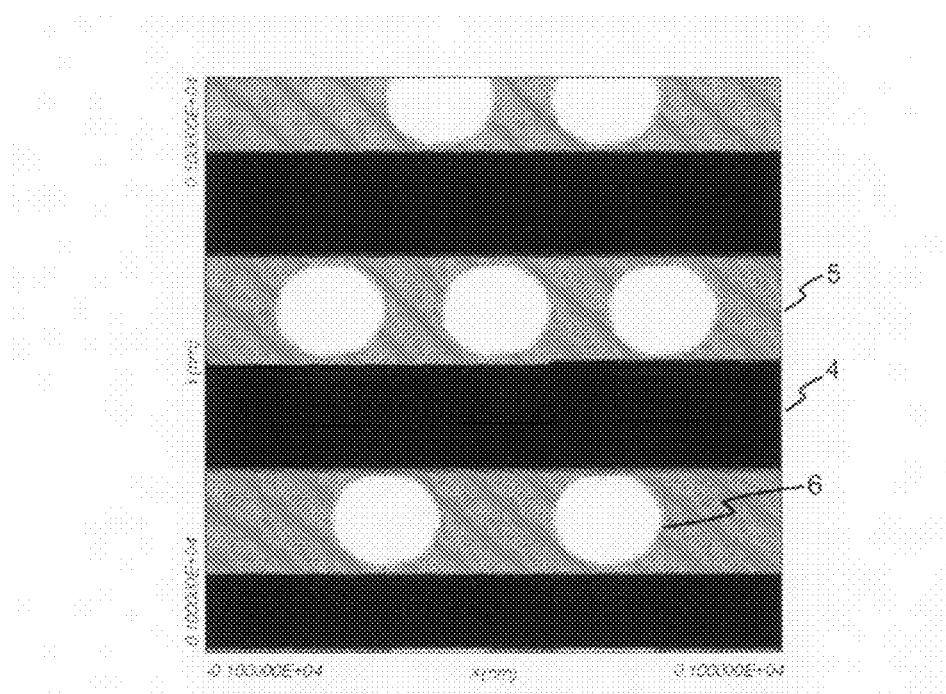
Figure 7:
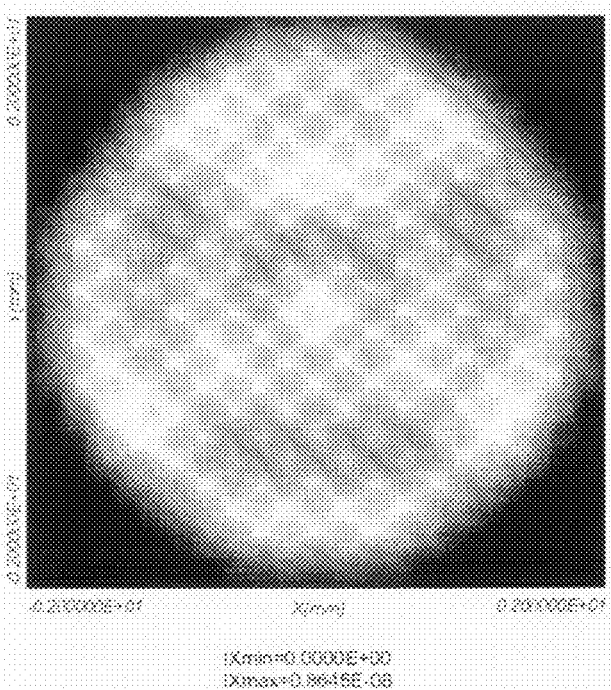
Figure 8:
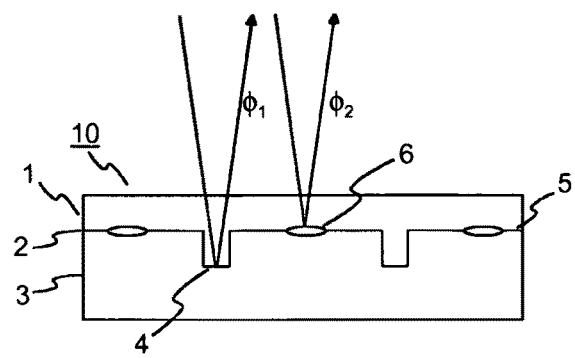
Figure 9:
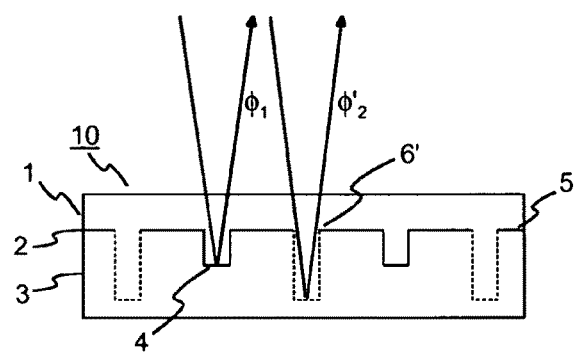
Figure 10:
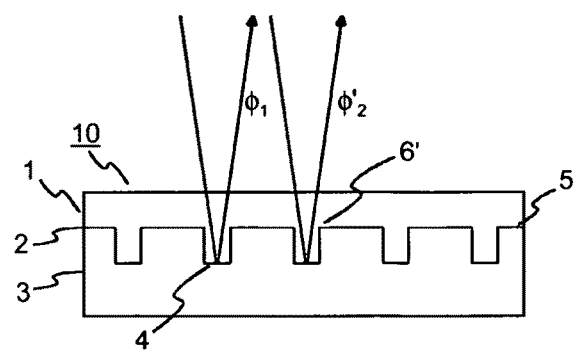

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 illustrates the general structure of an optical recording medium,

FIG. 2 shows a first example of an optical recording medium according to the invention with written marks, FIG. 3 depicts how the written marks can be represented by an additional groove, FIG. 4 shows a simulation of the structure of the optical recording medium of FIG. 2 in an unrecorded state, FIG. 5 depicts the intensity distribution in the pupil of an objective lens resulting from the phase shift distribution of FIG. 4, FIG. 6 shows a simulation of the structure of the optical recording medium of FIG. 2 in a recorded state, FIG. 7 depicts the intensity distribution in the pupil of an objective lens resulting from the phase shift distribution of FIG. 6, FIG. 8 shows a second example of an optical recording medium according to the invention with written marks, FIG. 9 depicts how the written marks can be represented by an additional groove of twice the depths of the original grooves, and FIG. 10 illustrates how the original grooves and the additional grooves in average are similar.

In the following the invention is explained with reference to a DVD-like optical recording medium, which is read with a wavelength around 650 nm. Of course, the general idea of the invention is also applicable to other types of optical recording media.

The general structure of an optical recording medium 10 is shown schematically in FIG. 1. A cover-layer 1 protects a recording layer 2, which is situated above a reflective substrate 3. The recording layer 2 consists of a dye, an inorganic material or a phase change material that is sensitive for recording at a wavelength around 650 nm, and that allows read-out at a wavelength around 650 nm. Of course, the recording layer 2 may likewise be sensitive to a different recording wavelength, e.g. 405 nm. The recording layer 2 has a structure of grooves 4 and lands 5. Recorded marks 6, which are generated by a laser beam 7 focused by an objective lens 8 are located between the grooves 4.

The optical recording medium 10 is designed in such a way that it can be read out with any standard DVD player or recorder. This requires that the push-pull signal of the optical recording medium 10 is strong before recording, as it is necessary for tracking. After recording, however, the push-pull signal needs to be nearly zero, as the copy protection features of some optical pickups, especially recorder pickups, do not allow playing video material from optical recording media with a push-pull signal. Tracking in these cases is done using differential phase detection (DPD).

The land-groove structure of the optical recording medium 10 constitutes a grating, which diffracts the focused laser beam into several beams corresponding to the different diffraction orders of the grating. On the return path the different diffraction orders are collimated by the objective lens 8 and are sent onto a split detector with two sensitive areas A and B. Depending on the lateral position of the optical recording medium 10 the relative phase between the diffraction orders changes. Constructive interference increases the intensity on one sensitive area, while destructive interference darkens the opposite side. By subtracting the signals of A and B the push-pull tracking signal PP=A−B is obtained. In addition to the push-pull signal PP a normalized push-pull signal NPP can be derived, which is defined as NPP=(A−B)/(A+B). For further details see Chapter 7 of the book "Optical Recording" by A. Marchant, Addison-Wesley 1990.

Preferably, the optical recording medium 10 has a normalized push-pull signal with an absolute value larger than 0.2 in the unrecorded state and a normalized push-pull signal with an absolute value smaller than 0.1 in the recorded state. In other words, the push-pull amplitude for the recorded state is reduced by a factor of 2 compared to the push-pull amplitude for the unrecorded state.

The above described behavior of the push-pull signal is achieved by designing the layer stack of the optical recording medium 10 in such a way that the phase shift introduced by the written marks 6 is similar to the phase shift introduced by the grooves 4. If the marks 6 are situated in the land regions 5, the marks 6 generate a diffraction grating that is shifted by halve the track pitch relative to the land-groove structure. Therefore, the marks 6 produce an additional push-pull signal, which is 180 degree ($\pi$) out of phase with the push-pull signal from the land-groove structure. This reduces the total push-pull amplitude.

A first example of an optical recording medium 10 according to the invention is shown in FIG. 2. In this embodiment the lands 5 and grooves 4 have the same width. Due to this symmetry a relatively large part of the incident radiation, which is indicated by the arrows, is diffracted into the ±1st orders due to the phase shift $\phi_1$ introduced by the grooves 4, and not into higher orders. This results in a large push-pull signal. If marks 6 are written into the lands 5 of the optical recording medium 10, they introduce a phase shift $\phi_2$. As a consequence the symmetry is broken and the diffraction into higher orders increases. This lowers the diffraction into the ±1st orders, which are responsible for the push-pull signal. As a result the push-pull amplitude is reduced.

As illustrated in FIG. 3, the phase shift $\phi_2$ introduced by the marks 6 can also be represented by additional grooves 6', which have the same width as the written marks 6, provided that the phase shift $\phi'_2$ caused by these additional grooves 6' is similar to the phase shift $\phi_2$ caused by the marks 6.

A simulation of the above optical recording medium 10 is illustrated in FIGS. 4 to 7. FIGS. 4 and 6 show the structure of the optical recording medium 10 in the unrecorded state and in the recorded state with written marks, respectively. FIGS. 5 and 7 show the resulting intensity distribution IXmax in the pupil of the objective lens 8, and hence on the detector, for the case of maximal push-pull amplitude. Please note that in FIGS. 5 and 7 different scales are used for IXmax. The intensity peak in the upper area of FIG. 5 corresponds to the push-pull signal. The remaining peaks have no special significance.

The structure of the optical recording medium 10 used for the simulation has the following layers:
1. A plastic substrate with a refractive index n=1.6
2. A 50 nm thick dielectric layer ZnS—SiO$_2$ with n=2.3
3. A 30 nm thick recording layer GeSbTe with n=4.6+i*4.2
4. A 50 nm thick dielectric layer ZnS—SiO$_2$ with n=2.3
5. A 200 nm thick reflective aluminum layer with n=0.5+i*3.81

Both the grooves 4 and the lands 5 have a width of 370 nm, which yields a track pitch of 740 nm. The grooves 4 have a depth of 26 nm. A numerical aperture NA of 0.65 and a wavelength of 650 nm are used for readout the optical recording medium 10. The refractive index of the written (amorphous) GeSbTe marks 6 is n=4.2+i*1.9. The written marks 6 have a lengths of 390 nm and a widths of 320 nm. As an alternative to the phase change GeSbTe layer, the recording layer may be an inorganic recording layer, e.g. a Cu/Si bilayer.

A simulation with the software Diffract by MM Research, Inc. yields a normalized push-pull signal of −0.214 for the unrecorded state shown in FIG. 4. In the recorded state shown in FIG. 6 the normalized push-pull signal is +0.049 if the laser spot is situated on a pit and −0.205 if the laser beam is situated between two pits. Assuming that 50% of the tracks are covered with marks, the average push-pull signal is −0.078. By optimizing the depth of the grooves 4, it is possible to further reduce the push-pull signal for the recorded state.

A second example of an optical recording medium 10 according to the invention is shown in FIG. 8. In this embodiment the width of the written marks 6 is similar to the width of the grooves 4, and the phase shift $\phi_2$ introduced by the marks 6 is about twice the phase shift introduced by grooves 4. As a result the push-pull signal is close to zero in the recorded case.

As before the phase shift $\phi_2$ introduced by the written marks 6 can be represented by additional grooves 6', which have the same width as the written marks 6. These additional grooves are illustrated as dashed grooves in FIG. 9. Ideally, the phase shift introduced by the marks 6 should be similar to the one of the grooves 4 as depicted in FIG. 10. However, as the marks 6 alternate with unrecorded spaces, they are only present along 50% of the length of the lands 5. To compensate for this the phase shift of the marks 6 or equivalently the depth of the additional grooves 6' should be about twice the depth of the actual grooves 4. So on average the original grooves 4 and the additional grooves 6' are similar. This is depicted in FIG. 10. Of course, when the marks 6 are present more or less than 50% of the length of the lands, the phase shift of the marks 6 has to be adapted accordingly. In other words, the average phase shift caused by a sequence of marks 6 and spaces should be similar to the phase shift caused by the grooves 4. Compared to FIG. 8 the track pitch of the optical recording medium 10 is reduced by a factor of two. The smaller track pitch results in a larger diffraction angle. This, in turn, means that the push-pull signal is close to zero, as the ±1st diffraction orders do not reach the pupil of the objective lens 8 any more.

In the above exemplary embodiments it is assumed that the phase-shift introduced by the marks 6, which are written into the lands 5, has the same sign as the phase-shift caused by the grooves 4. In other words, the lands 5 are used as a reference. If the phase shift introduced by the marks 6 is in the opposite direction, the marks 6 are preferably written into the grooves 4. The phase shift of the marks 6 should in this case be similar to the phase shift caused by the lands 5, i.e. the grooves 4 serve as reference. In other words, the roles of lands 5 and grooves 4 are exchanged.

The invention claimed is:

1. An optical recording medium with a recording layer having a structure of lands and grooves, which generates a strong push-pull signal in an area of the recording layer without recorded marks and a small push-pull signal in an area of the recording layer with recorded marks, wherein an absolute value of the normalized strong push-pull signal is larger than 0.2 and an absolute value of the normalized small push-pull signal is lower than 0.1, wherein the recorded marks generate an additional push-pull signal, which is 180±20 degrees out of phase with the push-pull signal caused by the structure of lands and grooves.

2. The optical recording medium according to claim 1, wherein the lands and grooves have the same width.

3. The optical recording medium according to claim 2, wherein the width of the marks is within 80% and 100% of the width of the grooves when the marks are recorded in the lands, and within 80% and 100% of the width of the lands when the marks are recorded in the grooves.

4. The optical recording medium according to claim 1, wherein an average phase shift introduced by the marks and spaces between the marks is similar to a phase shift introduced by the grooves relative to the lands when the marks are recorded in the lands, and similar to a phase shift introduced by the lands relative to the grooves when the marks are recorded in the grooves.

5. The optical recording medium according to claim 1, wherein the recording layer is a phase change layer or an inorganic recording layer.

6. The optical recording medium according to claim 5, wherein the recording layer is a GeSbTe layer or a Cu/Si bilayer.

7. The optical recording medium according to claim 1, wherein the strong push-pull signal is obtained at a first wavelength and the small push-pull signal is obtained at a second wavelength.

8. The optical recording medium according to claim 7, wherein the first wavelength is around 405 nm and the second wavelength is around 650 nm.

* * * * *